United States Patent [19]

Carlberg

[11] 4,365,750

[45] Dec. 28, 1982

[54] ADJUSTABLE SPRINKLER SYSTEM

[75] Inventor: David Carlberg, Los Altos, Calif.

[73] Assignee: Engineering Systems Corporation, Santa Clara, Calif.

[21] Appl. No.: 219,847

[22] Filed: Dec. 24, 1980

Related U.S. Application Data

[63] Continuation-in-part of Ser. No. 110,653, Jan. 9, 1980, abandoned.

[51] Int. Cl.$^3$ ............................................. B05B 1/12
[52] U.S. Cl. ..................................... 239/276; 239/396; 239/458
[58] Field of Search ............................. 239/266–269, 239/276, 396, 458, 580, 581, DIG. 1

[56] References Cited

U.S. PATENT DOCUMENTS

| | | | |
|---|---|---|---|
| 898,759 | 9/1908 | Melavin | 239/458 |
| 1,183,150 | 5/1916 | Williams | 239/267 |
| 1,496,645 | 6/1924 | Kaufmann | 239/267 |
| 1,830,833 | 11/1931 | Green | 239/276 |
| 1,931,761 | 10/1933 | Hertel | 239/DIG. 1 |
| 2,196,456 | 4/1940 | Charroin | 239/276 |
| 2,533,969 | 12/1950 | Socall | 239/581 |
| 2,943,798 | 7/1960 | Rienks | 239/DIG. 1 |

FOREIGN PATENT DOCUMENTS 323894 6/1935 Italy ..................................... 239/458

Primary Examiner—Bruce H. Stoner, Jr.
Assistant Examiner—Michael J. Forman
Attorney, Agent, or Firm—Harris Zimmerman; Howard Cohen

[57] ABSTRACT

An adjustable sprinkler system includes a plurality of sprinkler units disposed about an area to receive water. Each sprinkler unit includes a tapered base portion driven into the earth, and a pair of connector nipples to receive and retain flexible tubing which connects the sprinkler units and supplies water under pressure thereto. Each sprinkler unit includes a cylindrical member extending upwardly from the tapered base portion, with a cap threaded onto the exterior of the cylindrical portion. An arbor is received in a bore in the cylindrical member and is secured pivotally therein. The arbor is rotatable to adjust the rate of flow of water from the sprinkler, while the cap is rotatable independently to vary the spray pattern issuing from each sprinkler.

1 Claim, 9 Drawing Figures

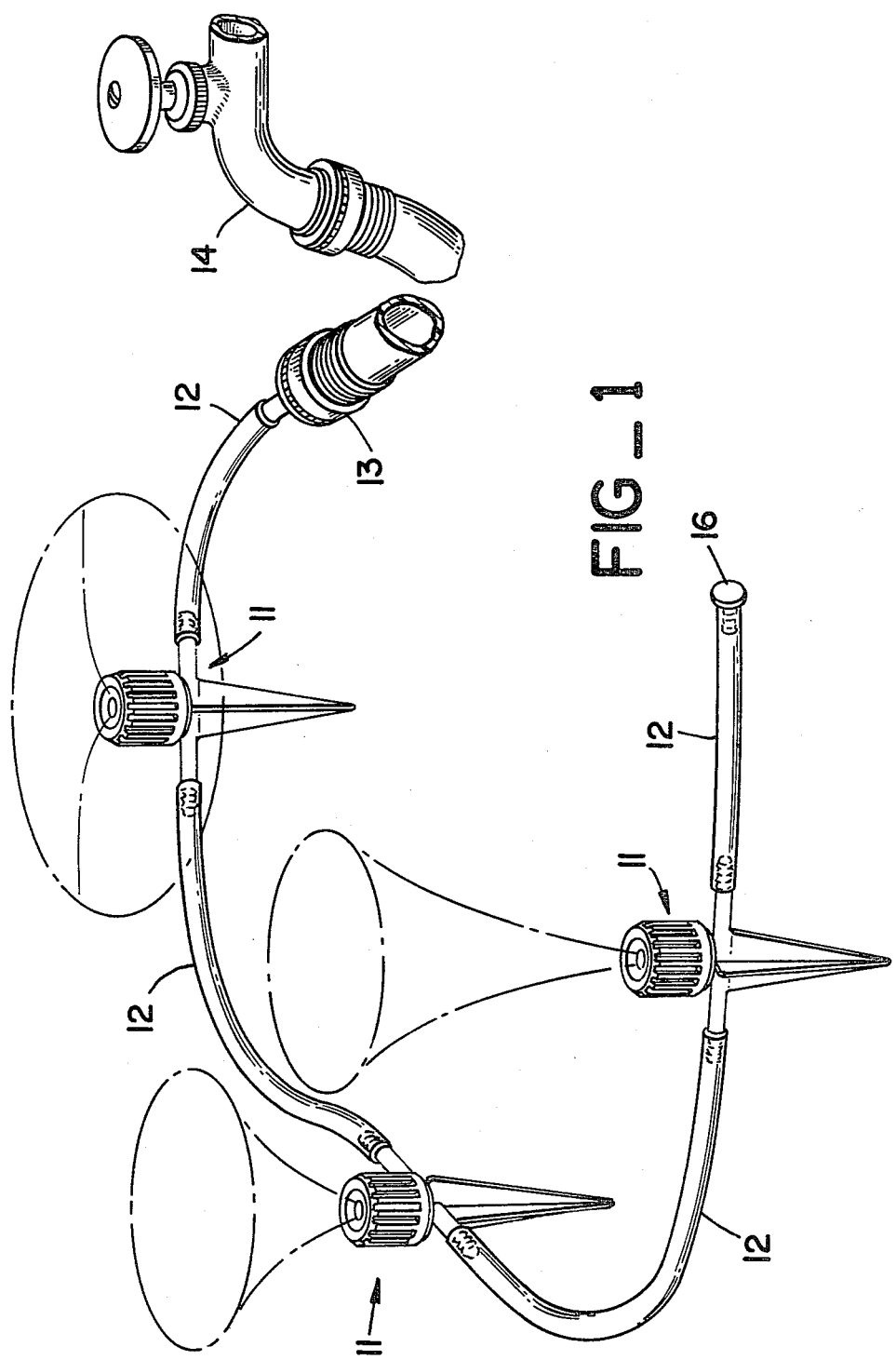

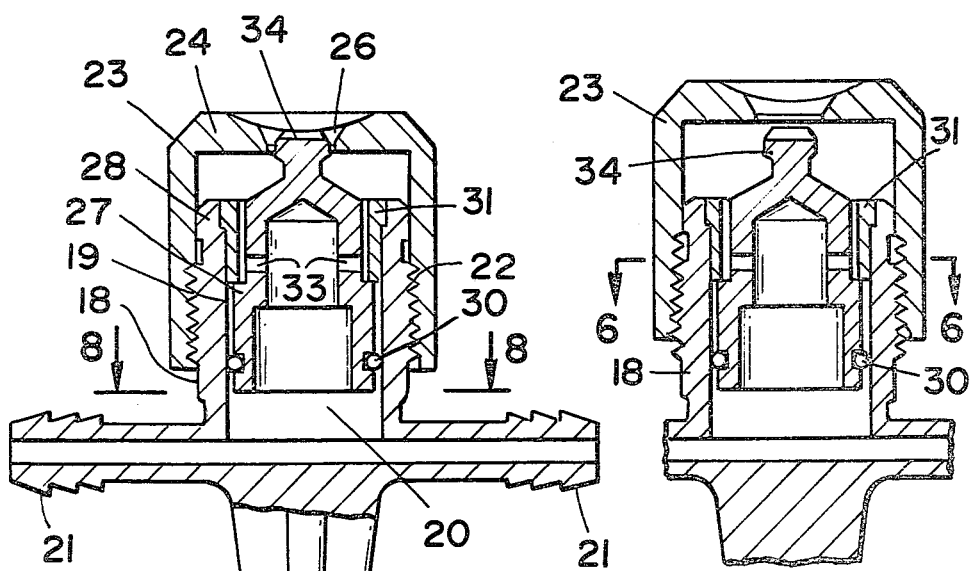
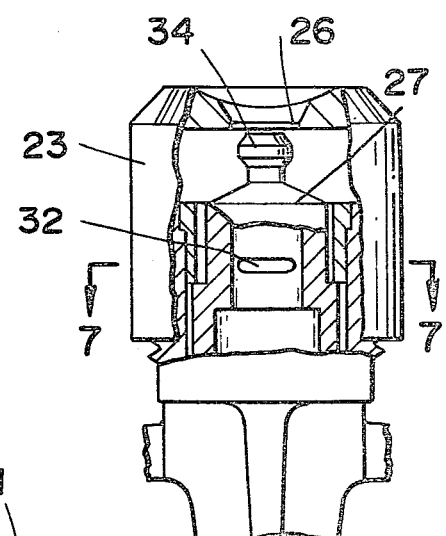
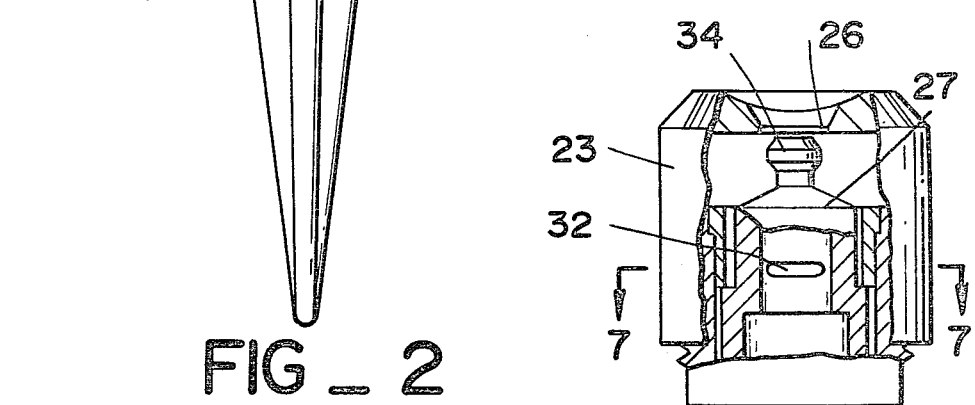
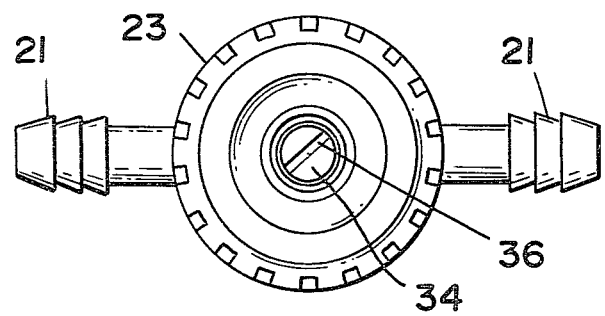

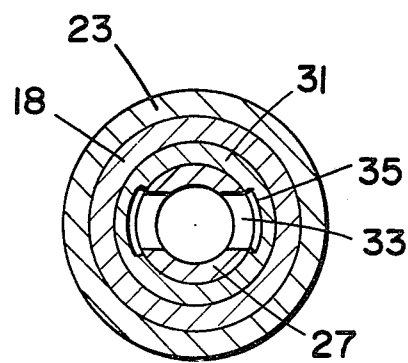
FIG_6
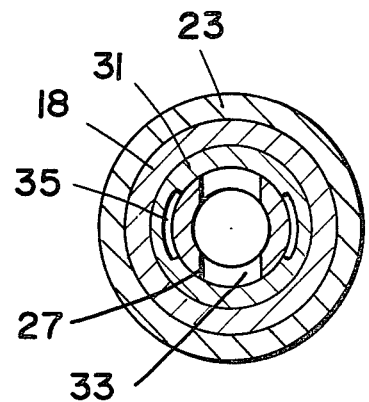
FIG_7
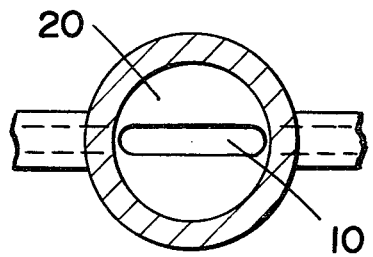
FIG_8
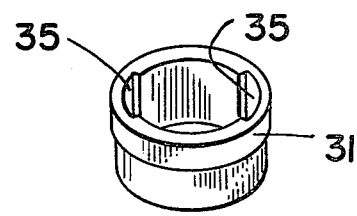
FIG_9

ADJUSTABLE SPRINKLER SYSTEM

REFERENCE TO RELATED APPLICATION

The instant application is a continuation-in-part of application Ser. No. 110,653, filed Jan. 9, 1980, ADJUSTABLE SPRINKLER SYSTEM, now abandoned.

BACKGROUND OF THE INVENTION

The following United States Letters patents comprise the closest known prior art:

U.S. Pat. Nos. 1,830,833, 2,066,531, 3,193,205, 3,586,239, 2,564,465, 3,385,525, 3,929,288.

There are known in the prior art many sprinkler systems for dispersing water over an earthen area to sustain crops or decorative plantings thereon. These systems often employ extensive water supply pipes which are buried in the earth, and thus require plumbing tools and skills for installation. Because of the extensive plumbing required, and also because of the trenches which must be dug to bury the supply pipes, these systems are far too expensive for the average home owner.

The patents cited above for their exemplary showing of prior art also point out another shortcoming of the prior art. These devices generally employ some adjustment mechanism to vary the spray patterns emanating from the sprinkler. These adjustment mechanisms also affect the water output rate of the sprinkler devices. For example, if one selects a wide angle, fine mist spray pattern, the water output is generally extremely restricted. Conversely, if one chooses a narrow angle, more vertical water stream, the water output is extremely high. The prior art is thus deficient in that none of the sprinkler devices permit independent adjustment of the spray pattern and the water flow rate.

SUMMARY OF THE PRESENT INVENTION

The present invention generally comprises a low-cost sprinkler system which employs a plurality of sprinkler units dispersed about the area to receive water. These sprinkler units are connected in series by supply tubing, and are adapted to be easily relocated to alter the layout of the sprinkler system. Furthermore, each sprinkler unit is designed to provide independent adjustment of the spray pattern and the water output rate therefrom.

Each sprinkler unit includes a tapered base member adapted to be driven manually into the earth to anchor the sprinkler unit. Disposed atop the base member is a generally cylindrical housing having a hollow chamber therein. A pair of diametrically opposed connecting nipples extend from the housing and communicate with the interior chamber. The connector nipples are adapted to retain the hollow tubing which connects the sprinkler units in series.

The cylindrical housing is provided with an exterior threaded portion to receive and retain a cylindrical cap having corresponding internal threads. The cap includes an upper end wall through which a jet aperture extends in axial alignment.

The cylindrical housing includes an interior portion in the chamber thereof dimensioned to receive a hollow arbor which is rotatable therein. The arbor includes a plurality of radially extending passages which define a water flow path extending from the interior chamber, through the radial passages, through a flow space between the arbor and the interior wall of the chamber and thence through the jet aperture of the cap.

The arbor also includes a tapered head extending axially upwardly therefrom. The head is slightly narrower in diameter than the jet aperture of the cap, and is adapted to extend into the jet aperture to a selectively variable degree to control the spray pattern emanating from the jet aperture. The top surface of the tapered head includes a slot to facilitate rotating the arbor to vary the rate of water flow by varying the flow restriction of the annular gap between the arbor and the interior chamber.

A BRIEF DESCRIPTION OF THE DRAWING

FIG. 1 is a perspective view of the sprinkler system of the present invention.

FIG. 2 is a cross-sectional elevation of a sprinkler system of the present invention.

FIG. 3 is a partial cross-sectional elevation of a sprinkler unit of the present invention, shown in a low-flow vertical spray disposition.

FIG. 4 is a top view of the sprinkler unit of the present invention.

FIG. 5 is a partially cutaway elevation of the present invention, shown in the non-flow position.

FIG. 6 is a cross-sectional view of the invention, taken along line 6—6 of FIG. 3.

FIG. 7 is a cross-sectional view of the invention, taken along line 7—7 of FIG. 5.

FIG. 8 is a cross-sectional view of the invention, taken along line 8—8 of FIG. 2.

FIG. 9 is a perspective view of the bushing of the present invention.

DESCRIPTION OF THE PREFERRED EMBODIMENT

With reference to FIG. 1, the present invention generally comprises a sprinkler system for lawns, gardens, and the like. The system includes a plurality of individual sprinkler units 11 which are connected in series by segments of hollow tubing 12. One of the tubing segments 12 is connected through a coupler 13 to a water supply faucet 14. The distal tubing segment is provided with a plug 16 in the distal end thereof to prevent water outflow therefrom. Water from the faucet 14 passes through the segments 12 to all of the sprinkler units 11, which in turn discharge water to their respective surrounding areas in a controlled flow, controlled pattern fashion.

With reference to FIG. 2, each sprinkler unit 11 includes a downwardly tapering base member 17 which is adapted to be driven manually into the earth. Disposed atop the base member 17 and aligned axially therewith is a cylindrical housing 18. The housing 18 includes an interior chamber 19 having a bottom wall 20 and a slot opening 10 therethrough, as shown in FIG. 8. A pair of connector nipples 21 extend in diametrically opposed fashion from the units at the junction of the base member and the housing. The connector nipples 21 provide flow communication with the slot opening 10 and the interior chamber 19, and also receive and retain the ends of the hollow tubing segments 12 which supply the water to the sprinkler units.

The cylindrical housing 18 includes an exterior threaded portion 22, as shown in FIGS. 2 and 3. Each sprinkler unit 11 includes a generally cylindrical cap 23 having a hollow interior and an interior threaded portion adapted to engage the exterior threads 22 of the housing. The lower end of the cap 23 is open and the upper end is closed by an end wall 24. A jet aperture 26 extends through the top panel 24, and is disposed axially with respect to the cap 23 and the housing 18.

Disposed concentrically within the interior chamber 19 is an arbor 27 supported on bottom wall 20. The arbor 27 is generally hollow, and is provided with a reduced diameter upper portion 28. An O-ring seal 30 prevents water flow between the outer surface of the arbor and the bore of the chamber 19. Secured fixedly in the upper end of the interior chamber 19 is an annular bushing 31 which surrounds the reduced diameter portion 28. With reference to FIG. 9, the inner surface of the bushing 31 is bilaterally symmetrical, each half being provided with a longitudinally extending slot 35 of increased radius.

The arbor also includes a pair of slot passages 33 which extend radially from the hollow core of the arbor through the lower extent of the portion 28 of the arbor 27. The passages 33 provide a flow path for water which extends from the interior chamber 19, through the passages 33, through the bushing slots 35, and thence through the jet aperture 26. It may be appreciated that the flow constriction provided by this flow path varies according to the position of the passages 33 with respect to the slots 35 of the inner surface of the bushing 31. Thus, as shown in FIGS. 5 and 7, for example, the passages 33 may be aligned completely out of registration with the slots 35. In that orientation, the flow path is completely interrupted and there is no water flow therethrough. If the passages 33 are aligned completely with the slots 35, as shown in FIGS. 2, 3, and 6, the water flow therethrough is maximized. Between these two extremes there is a continuum of control settings of the rotatable arbor 27, so that the arbor provides infinite variation of the water flow from the sprinkler units 11.

The upper end of the arbor 27 is provided with a tapered head 34 which is slightly smaller in diameter than the jet aperture 26. As is known in the prior art, the extent to which the head 34 extends into the aperture 26 has a great effect on the direction in which water is ejected from the jet aperture. This effect is selectively variable by rotating the cap 23 in its threaded engagement with the housing 18 to raise or lower the cap with respect to the head 34. For example, in the position shown in FIG. 2, the head 34 extends substantially into the aperture 26 so that the water ejected from the aperture tends to form a spray which has a wide angular divergence with respect to the axis of the unit 11. In the disposition shwn in FIG. 3, the cap has been rotated counterclockwise so that the head 34 does not extend into the aperture 26 at all. In this position, the water will issue from the aperture 26 in a generally vertical stream which has a very small angular divergence. Thus the position of the cap 23 with respect to the head 34 controls the spray pattern of the water discharging from the sprinkler unit.

As shown in FIG. 4, the upper surface of the head 34 is provided with a slot 36 to facilitate rotation thereof by a screwdriver or similar tool. It may be appreciated that the arbor may be rotated to control the rate of water flow from the sprinkler independently of the control of the spray pattern afforded by the cap 23.

I claim:

1. A sprinkler device, including a tapered base member adapted to be inserted in earth, a housing secured superjacently to said base member and including an upwardly opening chamber therein, means for supplying water to said chamber, a cap disposed about said housing, first means for securing said cap to said housing in selectively variable height relationship thereto, a jet aperture in an upper end of said cap, an arbor rotatably disposed in said chamber, second means for selectively varying the rate of flow of water from said housing through said upwardly opening chamber and through said jet aperture, a tapered head extending upwardly from said arbor and adapted to extend into said jet aperture to control the water spray pattern emanating therefrom, said first means selectively varying the vertical position of said head with respect to said aperture to vary said spray pattern, said first and second means functioning mutually independently, said second means including a bushing secured in said chamber and disposed about said arbor, and said bushing including an interior annular surface having a plurality of longitudinally extending slots of increased radius, said arbor having a plurality of radial flow passages extending therethrough and positioned for variable registration with said slots, said arbor being rotatable to position said flow passages with respect to said longitudinally extending slots.

* * * * *